United States Patent Office 3,465,570
Patented Sept. 9, 1969

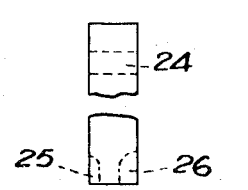
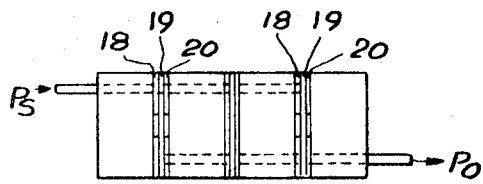
Fig.4.  Fig.6.
Fig. 7.
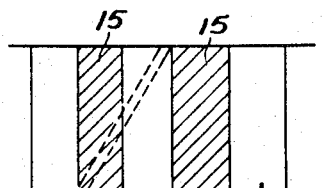
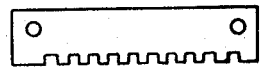
Fig. 8.  Fig. 9.
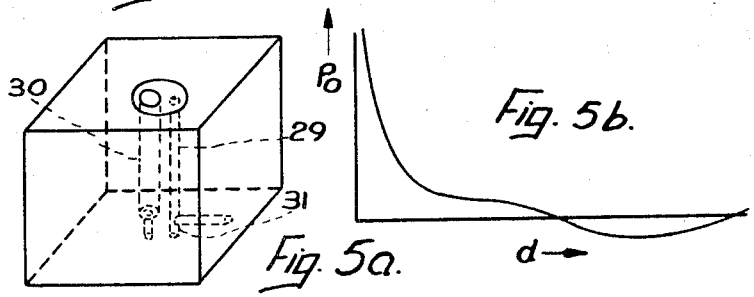
Fig. 5a.  Fig. 5b.
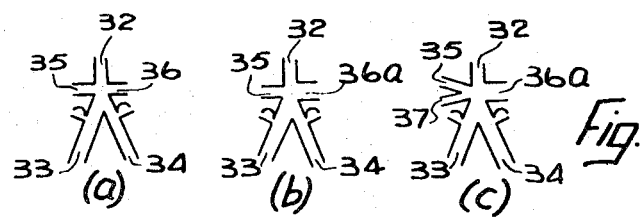
Fig. 11
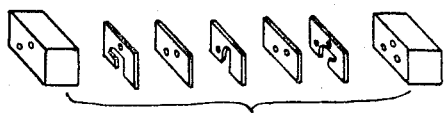
Fig. 12  Fig. 13.

3,465,570
DIGITAL MEASURING SYSTEMS
Robert Sisterson MacLean, Andrew Lindsay Muir McClintock, and Royds Sharp, East Kilbride, Glasgow, Scotland, assignors to National Research Development Corporation, London, England, a British body corporate
Filed Nov. 16, 1967, Ser. No. 683,509
Claims priority, application Great Britain, Jan. 16, 1967, 2,296/67
Int. Cl. G01b *13/08;* B23q *17/02*
U.S. Cl. 73—37.5                                    13 Claims

ABSTRACT OF THE DISCLOSURE

For purposes of digital measuring systems a position indicating transducer comprises a pneumatic gauge as index and a regularly slotted member as scale. The gauge and scale member are so related that the gauge output increases over a slot and decreases over a rib between successive slots. In one form the gauge has a single jet orifice in the form of a slit of closely similar width to the slots, and in another form the gauge has a blower jet orifice and at least one receiver orifice spaced therefrom.

---

Most of the present available measuring systems for numerical control of machine tools are principally electronic in nature and in some forms of these the measuring scale is an optical grating, optical information being converted to electrical signal form by photocells and positional control data then being derived by electronic logic devices.

However, attention has more recently been given to fluid techniques for potential qualities of robustness, economy, and an ability to withstand the adverse conditions which may arise in industrial applications. A basic requirement for this purpose is the provision of appropriate transducer arrangements to convert positional measurements into digital fluid pressure signals and one approach to this end has been to propose a fluid analogue to an optical grating. One such proposal has been made whereby an air jet is passed or interrupted by the presence or absence of an aperture in a scale member, but difficulty may arise in practical application.

The present invention concerns an alternative approach to meeting the afore-mentioned requirement and proposes, for this purpose, a pneumatic gauge and regularly slotted, corrugated or like scale member arranged for relative movement therebetween transversely of the depressions in the member, the gauge and member being so related that, during such movement, the magnitude of the gauge output exhibits an increase when the gauge is over a depressed region of the member, and a decrease over a raised region.

It will be appreciated, as indicated hereinafter, that this characteristic is in contrast to that of a conventional pneumatic gauge arrangement which exhibits a proportionate decrease in output pressure for an increase in separation between the gauge and the associated surface of a scale.

Figure 1A:
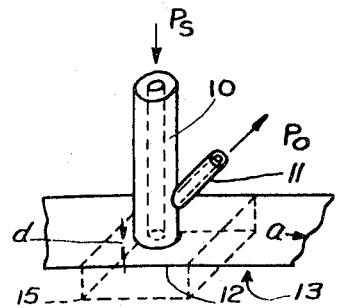
Figure 2A:
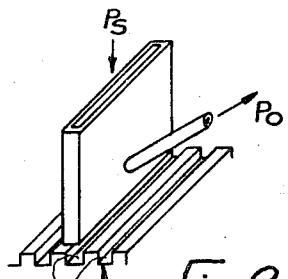
Figure 3:
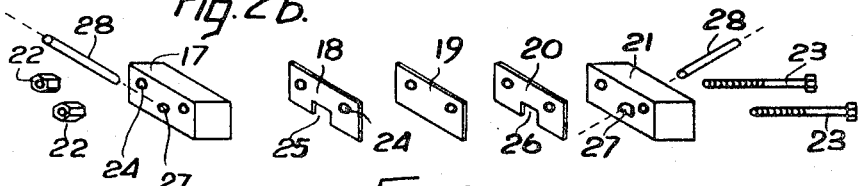
Figure 10:
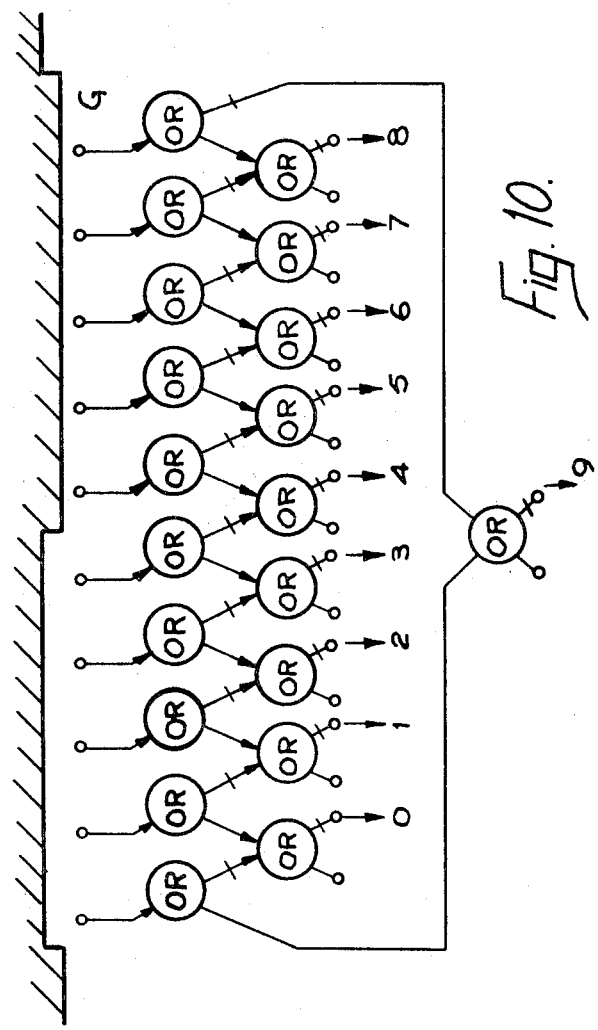

For a clearer understanding of the present invention the same will be described, by way of example, with reference to the accompanying drawings, in which:

FIGURES 1(a), (b) and (c) respectively illustrate a capillary form of pneumatic proximity gauge arrangement and operating characteristics therefor, FIGURES 2(a), (b) and (c) respectively illustrated one embodiment of a gauge arrangement according to the invention and operating characteristics therefor, FIGURE 3 illustrates, in exploded form, a laminated construction of a preferred embodiment of gauge according to the invention, FIGURE 4 illustrates an alternative construction for the embodiment of FIGURE 3, FIGURES 5(a) and (b) respectively illustrate another gauge embodiment according to the invention and an operating characteristic therefor, FIGURE 6 illustrates one embodiment of a multiple gauge according to the invention for use of averaging techniques, FIGURE 7 illustrates lamination forms for construction of the gauge of FIGURE 6 similarly to that of FIGURE 3, FIGURE 8 illustrates a further multiple gauge arrangement according to the invention for interpolation purposes, FIGURE 9 illustrates a lamination form for construction of a gauge such as in FIGURE 8 similarly to that of FIGURE 3, FIGURE 10 illustrates an ararngement of logic function devices for gating the signals derived from use of a gauge such as that of FIGURE 8, FIGURE 11 schematically illustrates forms of fluidic gate element suitable for use with a gauge according to the invention, FIGURE 12 illustrates an effectively complementary gauge form to that of FIGURE 8, and FIGURE 13 illustrates lamination forms for construction of a modified form of gauge relative to that of FIGURES 6 and 7.

Figure 1B:
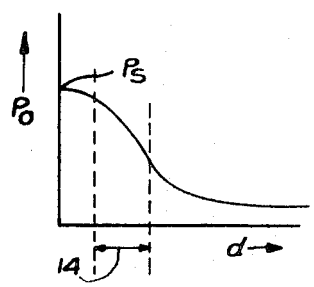

Considering FIGURE 1, this illustrates under FIGURE 1(a) the capillary form of pneumatic proximity gauge having an inlet conduit 10 for supply of air under pressure $P_s$, an outlet conduit 11 for escape of air under varying pressure $P_o$, and an orifice 12 spaced by a distance or gap $d$ from a plain surface of a member 13, variation of the gap $d$ causing variation in the back pressure affecting pressure $P_o$. When the surface of member 13 is plane or has depressions of width much larger than that of orifice 12, the relationship between gap $d$ and the output pressure $P_o$ is indicated by the characteristic under FIGURE 1(b), this being of known form whereby as $d$ increases from zero, $P_o$ falls from a maximum value equal to $P_s$ to a substantially constant minimum or normal standing pressure value.

Conventional use of such an arrangement as a proximity gauge derives from the approximately linearly sloping part of the latter characteristic over its so-called proportional region 14 wherein change in $d$ and $P_o$ are directly proportional for practical purposes.

Figure 1C:
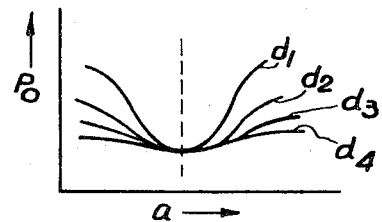

Passage of such an arrangement over a slot as indicated in broken line at 15 in the member 13 will normally give rise to characteristics of the form shown by FIGURE 1(c) for different values of $d$. Such a system is not acceptable in practice for positional control purposes since, as the orifice dimension in the direction of transverse movement is reduced for association with slots of finer pitch or for improved response to the edge of a coarser slot, so the maximum working gap which can be usefully employed must also be reduced. Thus, errors due to gap variation are proportionately increased.

Figure 2B:
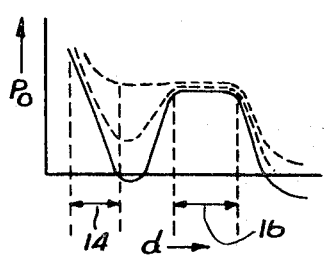

Turning to the embodiment illustrated by FIGURE 2(a) according to the invention, this comprises an orifice of narrow rectangular section or slit form having a width similar to that of the slots in the associated scale member surface which in this case is of regularly slotted form. FIGURE 2(b) shows the characteristic relationship between output pressure and working gap with the gauge centred over a slot to be quite different in this case from that under FIGURE 1(b). In this case, a rise in output pressure is obtained which is evident over a gap distance both within and without the proportional region 14 for the gauge when used adjacent a plane surface. This rise is, in fact, most marked for a gap outside the proportional region and in this extra region 16, moreover, there is found to be a maximum output which is substantially constant for variation in gap over a range of several thousandths of an inch. This is exhibited by the plateau formation in the characteristic of FIGURE 2(b) and is thought to be the result of standing reflections from the bottom of the slot. Certainly, this phenomenon is enhanced as the orifice and slot widths are more accurately matched.

Factors other than width, such as slot depth, may also influence the characteristic of FIGURE 2(b) and variation in the latter is indicated by further possible characteristics in broken line form.

Figure 2C:
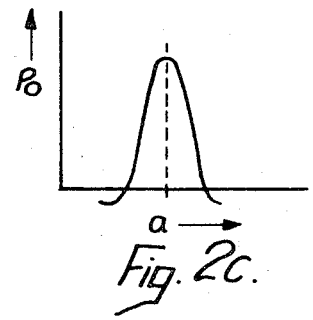

Passage of the gauge across the index at an appropriate gap outside the proportional region will thus give an output pressure response characteristic as indicated by FIGURE 2(c) and this response is reasonably independent of gap variations from a nominal setting.

The embodiment just described with reference to FIGURE 2 can be regarded as representing a first form of the present invention which employs a gauge of capillary type. This form of the invention, while useful in practice, is subject to limitations in some respects. For example, as indicated above the gauge orifice should be of slit form having a width of the same order, and preferably closely matched, to that of the associated scale member slots. Also, the latter slots should be of generally rectangular section and the depth of such slots is of significance.

This first form of the invention is, then, subject to a number of more restrictive considerations concerning the geometry of the gauge and scale member.

In a second form of the present invention a different type of gauge is employed having two orifices, one for applying air under pressuure and the other to receive air under the resultant back pressure during use. This second form of the invention also gives rise to operational characteristics as described above with reference to FIGURE 2, but it is subject to looser restrictions as to geometry.

One embodiment of such a double orifice gauge is illustrated in exploded form in FIGURE 3, this gauge being of laminated construction with a succession of end block 17, blower shim 18, divider shim 19, receiver shim 20, and end block 21 held together by nuts 22 and bolts 23. Each lamination has a pair of appropriately disposed bolt holes 24, the blower and receiver shims 18 and 20 are additionally notched at 25 and 26 respectively to provide orifices in the working face (the lowermost face in FIGURE 3) of the assembled gauge, and the end blocks 17 and 21 are additionally provided with passageways 27 for communication between input and output tubes 28 received therein and the respective orifice notches. Typical thicknesses for the shims 18, 19 and 20 in practice may be 0.002, 0.005 and 0.005 inch respectively. The lengths and depths of the orifice openings formed by notches 25 and 26 are not critical. Any suitable material, such as steel, may be employed in the manufacture of such a gauge.

In an alternative construction of double slit gauge similar to that of FIGURE 3, the shims 18, 19 and 20 may be replaced by a single, appropriately thicker lamination suitably notched at the working edge partway thereinto from the opposite side faces, as indicated by FIGURE 4.

As already mentioned the second form of the invention is subject to looser restrictions than the first as to geometry and, for example, it is not necessary that the orifices be of slit form such as described with reference to FIGURES 3 and 4. Instead, the orifices may be of other forms such as circular section. Also, the scale member need not be of generally rectangular section but may be of almost any regular depression section profile without close limitations as to width and depth relative to the associated orifice dimensions.

Considering practical applications, a more common requirement is that of positional measurement, that is to say scale pitch measurement, and in this case both forms of the invention are suitable.

Another requirement in practice may be for determination of the width of the slots or other depressions in the scale member. This may be effected by use of what can be termed zero pressure switching as discussed hereinafter, but is preferably effected by use of a double orifice gauge with appropriate choice of scale slot width, by adjustment of the mark/space ratio of the scale slotting relative to the width to be measured. For example, if an indication of 0.005 widths is required a scale member having slots of 0.006 inch width can in fact be used to compensate for the error which would otherwise arise with slots of 0.005 inch width. This latter error is partly a function of the blower orifice width, the error increasing with such width, and an appropriate narrow blower orifice should be used. This manner of width measurement can be usefully employed with relatively fine and medium width slots, which can be respectively taken as less than 0.02 inch or in the range 0.02 to 0.06 inch for the present purpose, for example. However, it may not be found satisfactory in the case of coarser width slots which can, in the same way, be taken as greater than 0.06 inch.

In this last case, and possibly for medium width slots also, it is preferred that width measurement be effected by use of a double orifice gauge subject to positive bias in operation and associated with relatively deep slots. This arrangement is in fact employed to detect the boundaries, that is the edges, rather than the continuous disposition of a slot.

Now when a double slot gauge is moved across the boundary of a plane surface into free space, this representing a slot edge, the output pressure changes from a negative value to zero. However, conventional turbulent reattachment fluidic elements such as might be used to gate the variation in gauge output indicating a slot edge require either a positive pressure input from normal switching, or an input which crosses from negative to positive for vent controlled switching. To achieve a positive-to-negative traverse in this case, a positive standing pressure or bias is introduced into the gauge output characteristic. This bias may be derived from the blower supply and FIGURE 5 illustrates one embodiment of gauge adapted for this purpose. In FIGURE 5(a), the capillary passageway 29 serves to channel a controlled bleed from the blower passageway 30 supply to the receiver passageway 31, the bias provided in this way being automatically adjusted with variation in supply pressure. FIGURE 5(b) indicates the operating characteristic obtained by variation of the separation $d$ in the notation employed above. It will be appreciated that since, in the application under discussion, use is to be made of the relatively extensive negative region of the characteristic of FIGURE 5(b), the mean value of separation $d$ in use may be larger than in other applications.

In any event, this use of positive bias allows a gauge of normal dimensions, such as having a blower orifice of 0.001 to 0.004 inch width, for example, to be used for slot width measurement. As to the associated scale member: the slots should be deep enough to ensure that the positive pressure region of the gauge characteristic is not swamped by any tendency to entrainment, and wide enough to ensure that the more normal double orifice gauge characteristic does not arise.

A third requirement which may arise in practical application is that of what can be termed direction sensing.

It has been mentioned above that, if a double orifice gauge is moved across the edge of a surface into free space, the output pressure changes from negative to zero. If, however, the direction of motion is such that the blower orifice is caused to lag the receiver orifice is crossing the edge, a positive pressure occurs at some intermediate position during the transition from negative to zero pressure.

This may be explained by considering that when both the blower and receiver are over the surface, entrainment occurs in the receiver; but when the receiver moves into free space ahead of the blower, the jet of air from the blower is deflected past the receiver, the angle of deflection being dependent on gauge-surface separation. If the separation is of suitable order, part of the deflected jet is collected by the receiver to produce a rise in output pressure, the effect being similar to that caused by the presence of a slot. Such a rise in output does not, however, occur for movement in the opposite direction when the blower leads the receiver into free space.

This operation could, for example, be useful in distinguishing one edge of an object from another by employing the gauge in an automatic inspection machine, the object surface effectively serving as a scale member.

It will, in any case, be appreciated that the output from a double orifice gauge, such as used in association with fine scales, is usually unsymmetrical with respect to the scale slots and this characteristic could be employed for direction sensing.

It may, for some purposes, be desirable to employ an averaging technique by use of a number of gauges separated one from another by a distance $b$ equal to an integral number times the associated index member slot spacing. FIGURE 6 illustrates one embodiment of a multiple gauge for this purpose constructed similarly to the laminated gauge of FIGURE 3, the modified lamination forms in this connection being illustrated by FIGURE 7.

For the purposes of application in numerical control of machine tools, resolution of the order of 0.001 inch in positional measurement is commonly desirable. While such resolution may be obtainable directly with a gauge arrangement such as described above in accordance with the invention, it is possible that interpolation arrangements may be required for this, or indeed other purposes.

In any event, interpolation can be effected by use of a multiple gauge comprising a number of individual gauge orifices aligned transversely across one pitch of an associated scale member such as schematically illustrated in FIGURE 8 for ten double orifice gauges, for example. This example could then provide a resolution of 0.001 inch with an index member pitch of 0.01 inch, say.

In practice, there is no need to employ individually assembled gauges for interpolation purposes, and in fact it will probably be preferable to employ a multiple gauge assembly derived by laminated constructions such as described above but with multiple notching along the appropriate shims. FIGURE 9 illustrates an example of a blower or receiver shim for this purpose.

An alternative arrangement for effecting interpolation can be with an annular array of gauges disposed around a screw form scale member, it being understood that relative movement is still only required as translation longitudinally of the screw axis. This arrangement as exemplified by FIGURE 12 effectively embodies the complement to that of FIGURE 8, whereby, instead of the gauges being angled across the scale member slots, the scale member slots are angled across the gauges, this being conveniently effected by the production of a helically slotted scale member. Again, a laminated multiple gauge construction can be employed in this connection.

In connection with a multiple gauge arrangement for interpolation, associated control circuits are desirable to ensure that no overlap occurs between the signal outputs representing the increments associated with the individual gauges as they successively pass across a given scale slot. Fluidic control means can be employed for this purpose to effect logic functions such as indicated by FIGURE 10, for example, whereby only one gauge at a time can give rise to a pulse output.

Now to operate in a digital measuring system, a single point in each cycle of gauge output for movement between adjacent slots must be accurately indicated. This can be effected by use of a bistable fluid logic element suitably biased to switch from one state to another when the gauge ouput reaches a certain pressure level.

One form of turbulent reattachment bistable fluidic element for this purpose is shown at $(a)$ in FIGURE 11. This element has an inlet port 32 for supply of air under pressure, two output ports 33 and 34, and two control ports 35 and 36. The function of the element is such that, if undisturbed by the control ports, a jet applied at the inlet will flow along either output 33 or 34 and remain attached thereto. Application of pressure differential of suitable polarity between the control ports 35 and 36 will cause the afore-mentioned flow to change its attachment to the other outlet.

To obtain the suitable bias for the element to switch at a certain pressure level, one control port is made larger than the other, as shown at $(b)$ in FIGURE 11, the larger control port being denoted as 36a. If a positive pressure is now applied at port 35, with port 36a vented to atmosphere, the flow attachment is altered and switches to the opposite outlet. With such geometry, the element is of monostable operation in that the flow will attach to outlet 33 upon removal of the bias.

If, in addition, a second inlet port 37 is added in association with control port 35, as shown at $(c)$ in FIGURE 11, the element can be operated as an OR/NOR switch. For convenience in practice, only one input of a standard OR/NOR unit is employed.

An alternative mode of operation with the arrangement of FIGURE 11($c$) involves applying a negative pressure to control port 36, while control port 35 is vented to atmosphere. In either case, operation as proposed with an arrangement such as shown by way of FIGURE 11($c$) produces switching which is more reliably defined than by comparison with an applied bias pressure.

While the present invention has been more particularly described with reference to specific embodiments, these are not intended to imply any limitation of the invention thereto, but rather to serve as examples indicating the broader scope of the invention. Thus, the invention takes account of single orifice gauges of capillary type, and multiple orifice gauges. The latter may have slit, circular or other orifice forms and need not even be restricted to the double orifice type described above. For example, yet another form may comprise a pair of receiver orifices disposed on opposite sides of a single blower orifice and such an arrangement may serve to reduce the number of individual gauges required in a multiple gauge arrangement as in FIGURE 6, say. FIGURE 13 illustrates such another form as may be constructed with laminations similar to FIGURE 7.

Regarding the associated scale member: this also is capable of significant variation as to profile with corresponding variation in gauge form or gauge operating characteristic. Indeed, the scale member may be the surface of an object of which the ends represent depressions for operating purposes.

Lastly, while the foregoing more particular description has been concerned with linear measuring systems, the present invention is equally well applicable to use in angular measuring systems.

We claim:

1. A transducer comprising a pneumatic gauge and a scale member presenting a ribbed surface of regularly alternating raised and depressed regions, said gauge and scale member being arranged for relative movement of the gauge transversely across said depressed regions, and said gauge and scale member being spaced apart and so related that, during said movement, the magnitude of the gauge output exhibits an increase when the gauge is over one of said depressed regions and a decrease when the gauge is over one of said raised regions.

2. A transducer comprising a pneumatic capillary gauge and a scale member presenting a ribbed surface of regularly alternating raised and depressed regions, said gauge and scale member being spaced apart and arranged for relative movement of the gauge transversely across said depressed regions, said gauge having a jet orifice in the form of a slit disposed other than perpendicular across said depressed regions, and the width of said slit being closely similar to the width of each of said depressed regions.

3. A transducer according to claim 2 wherein said depressed regions are each of substantially rectangular cross-sectional form.

4. A transducer comprising a pneumatic gauge and a scale member presenting a ribbed surface of regularly raised and depressed regions, said gauge and scale member being spaced apart and arranged for relative movement of the gauge transversely across said depressed regions, said gauge having a pair of separate fluid flow passageways respectively leading to a blower jet orifice and from a receiver input orifice, and said orifices being mutually spaced apart transversely of said depressed regions.

5. A transducer according to claim 4 comprising means for supplying a positive pressure bias fluid flow to the passageway leading from said receiver input orifice.

6. A transducer according to claim 5 wherein said supply means comprises a capillary bleed passageway communicating between said pair of passageways.

7. A transducer according to claim 4 comprising a further fluid flow passageway leading from a second receiver input orifice in said gauge, said second receiver input orifice being equally and oppositely spaced from said blower jet orifice relative to the first-mentioned receiver input orifice.

8. A transducer according to claim 4 wherein said raised and depressed regions are respectively constituted on the one hand, by a surface of an object, and on the other hand, by the ends of said surface and the spaces adjacent thereto.

9. A transducer assembly comprising a plurality of like gauges each as defined in claim 1 and having at least one orifice, but associated with a common scale member, said gauges being disposed with their respective orifices aligned and regularly spaced one behind the other, and the inter-gauge spacing being an integral multiple of the spacing between successive depressed regions of said common scale member.

10. An assembly according to claim 9 comprising at least one common fluid passageway interconnecting corresponding orifices, one each from said gauges.

11. A transducer assembly comprising a plurality of like gauges each as defined in claim 1 and having at least one orifice, but associated with a common scale member, said gauges being disposed with corresponding orifices successively aligned in mutually spaced apart side-by-side disposition at an angle to the axes of said depressed regions with each set of corresponding orifices spanning one cycle of alternation of the reigons of said scale member.

12. A transducer according to claim 1 of laminated structural form including at least one orifice shim clamped between members on opposite sides thereof, each orifice shim being notched at its edge to form an orifice space, and the structure being bored to form a respective fluid flow passageway communicating with each orifice space.

13. A transducer according to claim 1 wherein said scale member is of shaft form having helical raised and depressed regions therearound and mounted for rotation to effect said relative movement.

References Cited

UNITED STATES PATENTS

| | | | |
|---|---|---|---|
| 2,808,650 | 10/1957 | Kumagai | 33—125 |
| 2,918,666 | 12/1959 | Brower et al. | 33—125 |
| 3,170,100 | 2/1965 | Rantsch et al. | 33—125 |

FOREIGN PATENTS 119,357   4/1958   U.S.S.R.

LOUIS R. PRINCE, Primary Examiner

W. A. HENRY II, Assistant Examiner

U.S. Cl. X.R.

33—125